United States Patent [19]

Oles et al.

[11] Patent Number: 4,861,542
[45] Date of Patent: Aug. 29, 1989

[54] ROTARY BLOW MOLDING METHOD

[75] Inventors: Paul M. Oles; Frederick J. Shepps, both of York, Pa.

[73] Assignee: Graham Engineering Corporation, York, Pa.

[21] Appl. No.: 116,410

[22] Filed: Nov. 4, 1987

Related U.S. Application Data

[62] Division of Ser. No. 28,975, Mar. 23, 1987, abandoned.

[51] Int. Cl.$^4$ .................. B29C 49/36; B29C 49/04
[52] U.S. Cl. ...................... 264/542; 264/543; 425/531; 425/532
[58] Field of Search .......... 264/542, 543, 541, 536; 425/531, 532, 540

[56] References Cited

U.S. PATENT DOCUMENTS

| Re. 32,129 | 4/1986 | Aoki | 425/540 |
|---|---|---|---|
| 2,898,633 | 8/1959 | Burch | 264/542 |
| 2,901,769 | 9/1959 | Sherman et al. | 18/5 |
| 2,952,034 | 9/1960 | Fortner | 18/5 |
| 3,025,562 | 3/1962 | Nelson | 18/5 |
| 3,115,673 | 12/1963 | Rudolph | 18/5 |
| 3,243,847 | 4/1966 | Fogelberg et al. | 18/5 |
| 3,275,728 | 9/1966 | Martino | 264/541 X |
| 3,334,379 | 8/1967 | Di Settembrini | 18/5 |
| 3,449,481 | 6/1969 | Tahara | 264/543 |
| 3,496,600 | 2/1970 | Heston | 18/5 |
| 3,516,118 | 6/1970 | Gallay | 18/5 |
| 3,555,598 | 1/1971 | Mehnert | 18/5 |
| 3,614,807 | 10/1971 | Lagoutte | 18/5 |
| 3,764,250 | 10/1973 | Waterloo | 425/326 |
| 3,963,404 | 6/1976 | Pollock et al. | 425/540 |
| 4,421,472 | 12/1983 | Martin | 425/527 |
| 4,459,095 | 7/1984 | Rohr et al. | 264/543 X |
| 4,560,341 | 12/1985 | Hafele | 425/341 |
| 4,582,474 | 4/1986 | Ziegler | 425/503 |
| 4,589,838 | 5/1986 | Ziegler | 425/540 |
| 4,673,347 | 6/1987 | Ziegler | 425/538 |

FOREIGN PATENT DOCUMENTS

| 34823 | 9/1972 | Japan | 425/540 |
|---|---|---|---|
| 2904220 | 9/1982 | United Kingdom | 425/540 |

Primary Examiner—Jan H. Silbaugh
Assistant Examiner—Neil M. McCarthy
Attorney, Agent, or Firm—Thomas Tooker

[57] ABSTRACT

A rotary blow molding machine includes a base, a turntable on the base rotatable about a vertical axis and a number of mold units spaced around the turntable. Each mold unit includes a pair of mold halves which close on and capture a growing vertical parison at an extrusion station and then fall away from the parison as the parison is severed. The captured parison is blow molded and cooled as the blow unit is rotated around the turntable. The finished article, commonly a bottle, is ejected from between the mold halves before the mold halves return to the extrusion station.

4 Claims, 6 Drawing Sheets

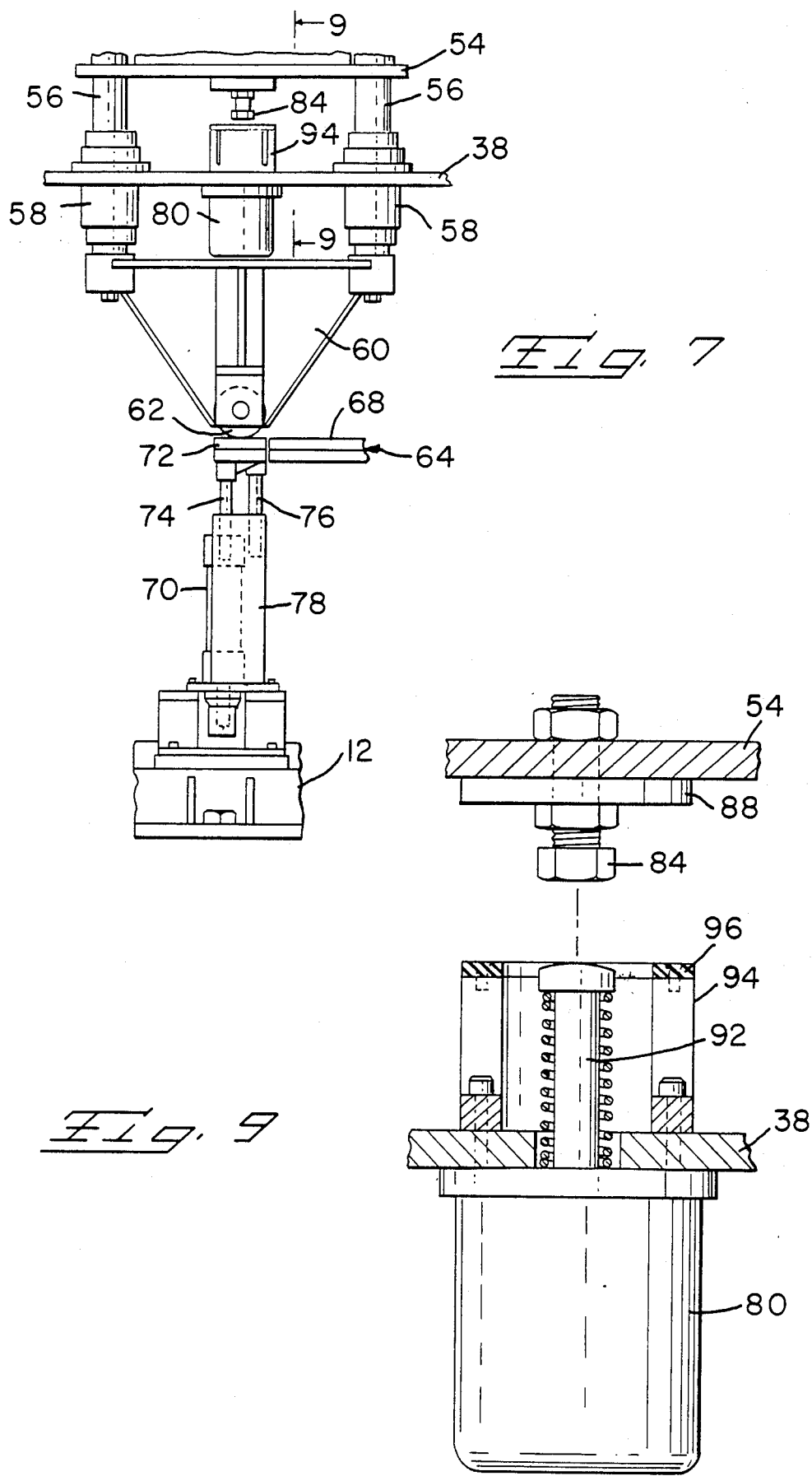

ROTARY BLOW MOLDING METHOD

This is a division of application Ser. No. 028,975, filed Mar. 23, 1987, and now abandoned.

BACKGROUND OF THE INVENTION

The invention relates to horizontal rotary blow molding machines and methods for manufacturing bottles and similar articles from thermoplastic resin parisons.

BRIEF DESCRIPTION OF THE PRIOR ART

Horizontal rotary blow molding machines index circumferentially spaced mold halves in steps around a vertical axis. The mold halves each capture a vertical, continuously growing parison at an extrusion station. In one machine the head extruding the parison moves up away from the mold halves after the mold halves close to capture the parison. The parison is severed adjacent the top of the mold halves, the mold halves are moved away from the extrusion station and a top blow pin is moved into the end of the captured parison at the top of the mold halves to seal the mold cavity and blow the parison. Subsequently, the extrusion head and dependent parison are lowered back to the initial position so that the new parison is in position to be captured by the next pair of mold halves. The blown parison cools as the mold halves are rotated around the machine, following which the mold halves open at an ejection station and the finished article, commonly a bottle, is ejected from between the mold halves. The machine includes an in-mold labeling station between the ejection station and the extrusion station for applying labels to the interior surfaces of the mold cavities.

Blowing of the captured parison is delayed until after the mold is moved away from the extrusion head and the blow pin has been moved into engagement with the top of the held parison. This interval of time increases the cycle time for the machine. A mechanism is required to raise and lower the extrusion head. Moving the extrusion head may move the growing parison with the ever-present risk that this movement will cause the end of the long, growing parison to shift laterally, thereby increasing the risk that the parison is not properly aligned when captured in the mold cavity.

When blow molding bottles using a blow pin entering the cavity at the top of the mold, there is a risk that the molten parison resin will gravity-flow down from the top of the cavity before the pin is extended into the cavity and confines the top of the parison against and the cavity mouth. This risk is increased in a machine where the captured parison must be moved a distance away from the extrusion head before the blow pin is inserted down into the mouth at the top of the mold.

In another horizontal rotary blow molding machine the parison grows down over a blow pin at the bottom of the mold halves prior to closing of the mold halves. The extrusion head is moved up above the closed mold prior to severing of the new parison from the captured parison. The mold is the indexed laterally to the next station without dropping and the captured parison is blown within the cavity. In a further horizontal rotary blow molding machine, the whole turntable supporting all of the mold halves is raised and lowered during rotation as each mold captures a parison at the extrusion station.

SUMMARY OF THE INVENTION

The present horizontal rotary blow molding machine indexes a number of mold halves around the circumference of a turntable past a plurality of stations. Elevated blow molds are indexed to an extrusion station to either side of a vertically growing parison extending down from a fixed extrusion head. The mold halves close to capture the parison and are then immediately dropped vertically below the extrusion head at a rate faster than the rate of parison growth. As the closed mold drops the parison is severed, either by tensile-breaking a weakened portion of the parison above the mold halves or by a cutting knife. When captured, the lower end of the parison extends over a blow pin located below the mold. Following closing of the mold halves on the parison blow air is flowed through the blow pin into the interior of the parison to expand the parison against the mold cavity. The lower end of the parison captured between the blow pin and the mouth of the cavity is confined and cannot flow away from the pin. The mold may be indexed away from the extrusion station immediately after severing of the captured parison.

The mold halves close on the parison and quickly move down from the stationary extrusion head and forming new parison without laterally disturbing the new parison. Blow molding commences immediately upon closing of the mold halves. These steps permit the machine to rapidly blow mold the parison, thereby decreasing the amount of time required to cycle the individual mold halves around the machine and make the blow molded articles, commonly bottles. The new parison grows straight down in position to extend over the blow pin of the next elevated mold moved to the extrusion station.

Each pair of hold halves is mounted on a movable mold unit for vertical movement relative to the extrusion head. A cam raises the mold unit to the elevated position from which the mold unit is indexed to the extrusion station and supported on a movable pad. After closing of the mold halves to capture the parison the pad is rapidly withdrawn, allowing the mold unit to gravity-fall away from the new growing parison. The falling mold unit engages a pair of shock absorbers which slow the unit before engaging a pair of supports. The mold unit may be indexed away from the extrusion station after severing of the parison and before the unit has fallen all the way down to the supports.

The machine also includes an improved mold clamp drive for moving both mold halves toward each other to capture the parison between the mold halves. The drive is actuated by a driver located radially inwardly of the mold halves. The drive forces the inner mold half radially outwardly along a pair of slide bars. The inner mold half is pushed by a clamp rod located a distance above the slide bars. The motion of the clamp drive is transmitted under the mold halves by actuating rods to a pivot bar located radially outwardly of the mold halves and then back to the mold halves, reversed in direction, by a second clamp rod. The clamp rods and actuating rods are located equal distances above and below the slide bars so that the mold halves are closed without subjecting the slide bars to high torsional forces. These forces could bend the slide bars and could prevent proper closing of the mold cavity.

Other objects and features of the invention will become apparent as the description proceeds, especially when taken in conjunction with the accompanying drawings illustrating the invention, of which there are six sheets and one example.

BRIEF DESCRIPTION OF THE DRAWINGS

FIG. 7 is a partially broken away view taken along line 7—7 of FIG. 3;

FIG. 9 is a sectional view taken generally along line 9—9 of FIG. 7.

DETAILED DESCRIPTION OF THE PREFERRED EXAMPLE OF THE INVENTION

Figure 1:
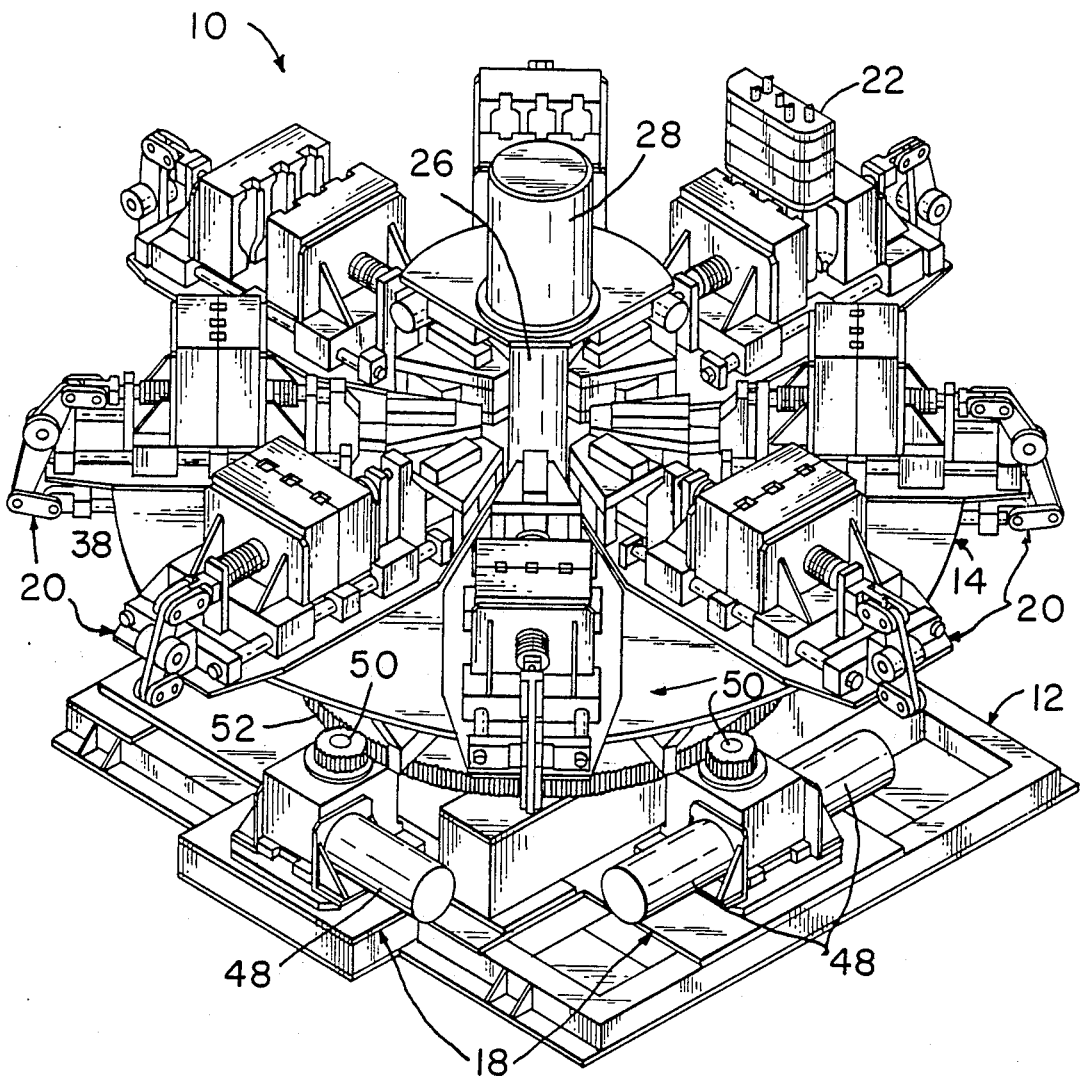
FIG. 1 is a perspective view of a rotary blow molding machine according to the invention.

Rotary blow molding machine 10 includes base 12, a turntable 14 mounted on the base for rotation around a vertical axis in the direction of arrow 16 and a turntable drive 18 on the base engagable with the turntable for indexing the turntable around the axis in steps. The turntable dwells for a period at each station 1 through 8.

Figure 3:
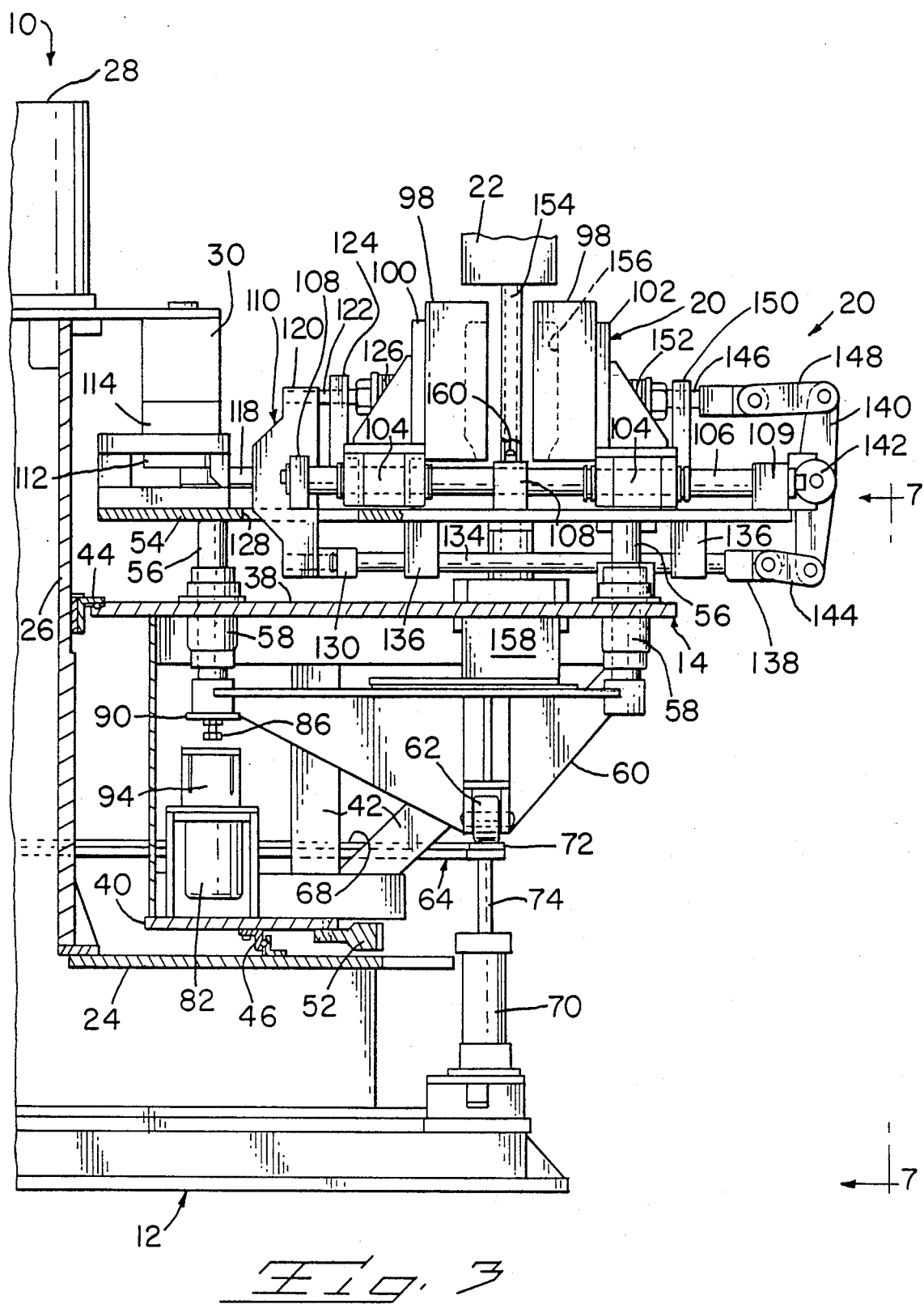
FIG. 3 is a vertical view taken generally along line 3—3 of FIG. 2.
Figure 4:
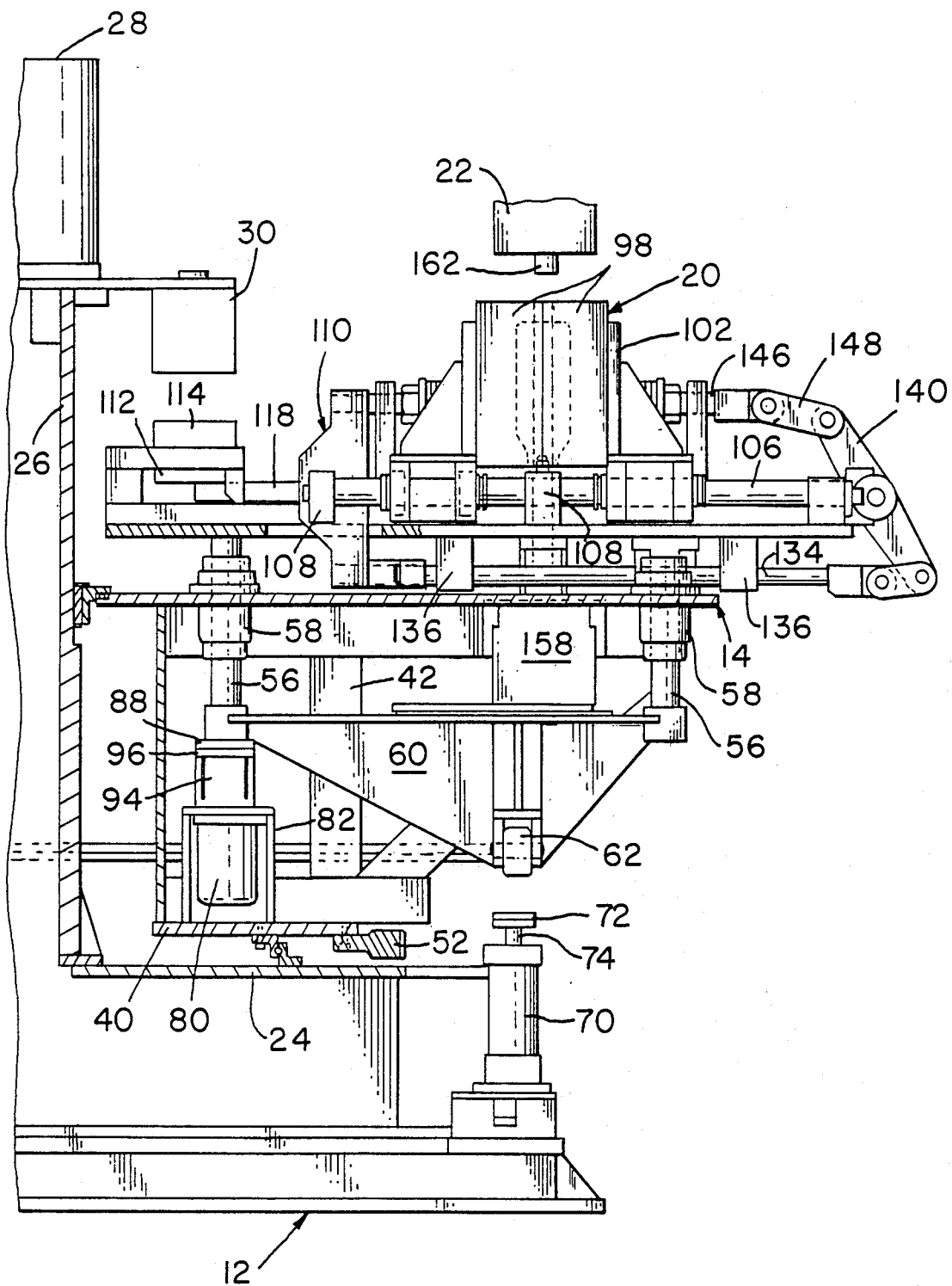
FIG. 4 is a view like FIG. 3 showing the mold halves closed.
Figure 5:
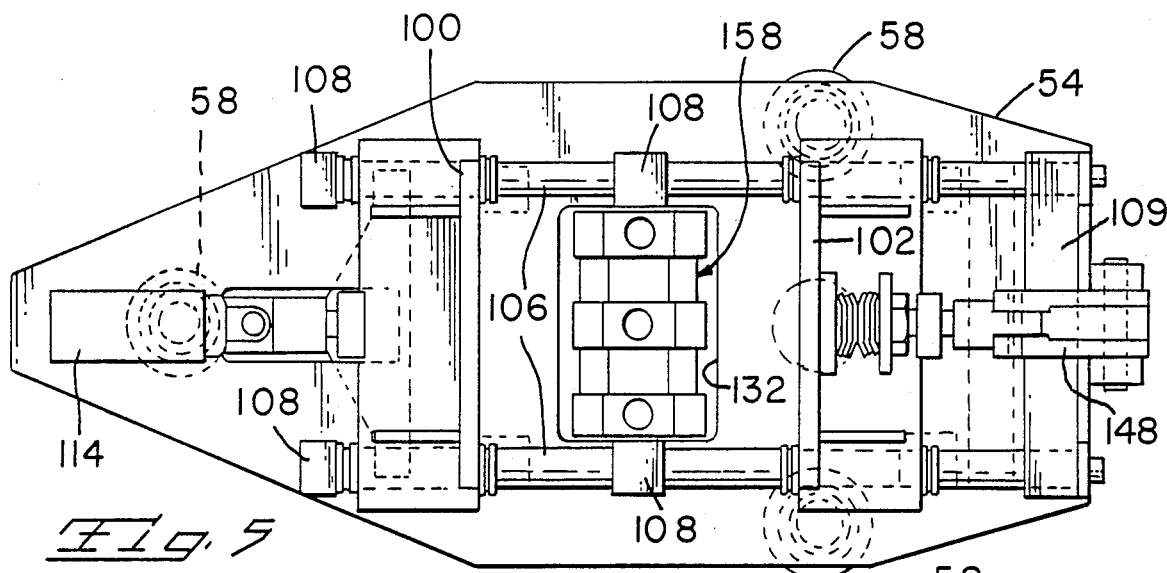
FIG. 5 is a top view, partially broken away, of the mold unit of FIG. 3.
Figure 6:
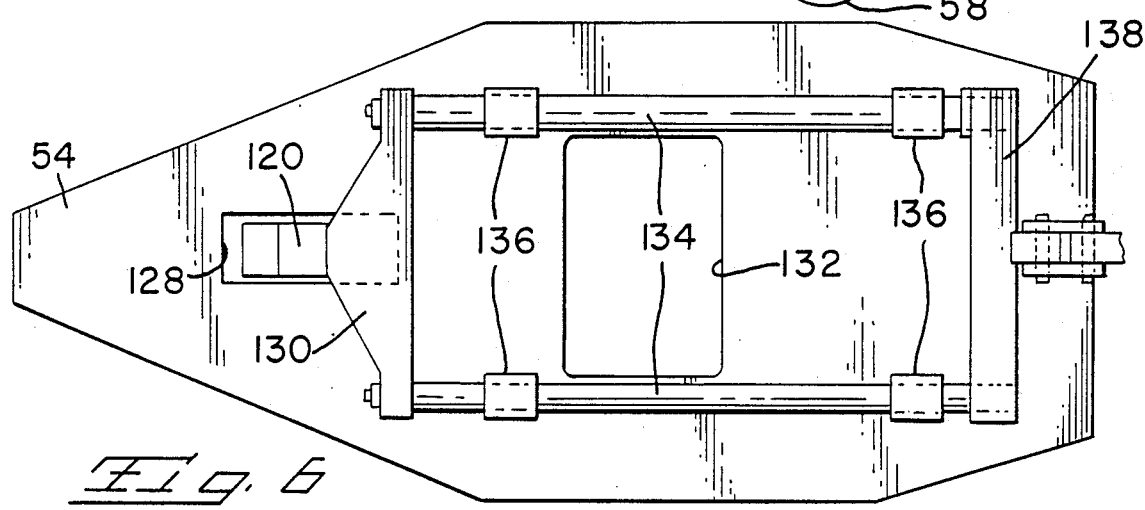
FIG. 6 is a partial bottom view of the mold unit of FIG. 5.

The turntable carries eight circumferentially spaced mold units 20. During a cycle of operation drive 18 indexes each unit 360 degrees around the machine from extrusion station 1, through molding and cooling stations 2-6, ejection station 7 and in-mold labeling station 8 and then back to the extrusion station 1. A fixed extrusion die head 22 shown in FIGS. 3 and 4 is located above station 1 and extrudes a parison for each mold cavity. The parisons extruded by the head are captured in a mold halves carried by the mold units, blown and cooled as the mold units are indexed through stations 2 through 6. The resultant articles, commonly bottles, are ejected at station 7. An in-mold labeling device (not illustrated) may supply labels to the open empty mold cavities at station 8 prior to indexing of the mold unit back to station 1.

Base 12 includes a support plate 24 and a central control tower 26 extending upwardly from the plate and aligned with the rotational axis of the machine. A rotary union 28 is mounted on the top of the tower. The union connects each mold unit to suitable cooling water and pressure fluid lines. Driver 30 is mounted on the tower above the inner portion of station 1. Driver 32 is mounted on the tower above the inner portion of station 7. Each driver includes a drive head 34.

The turntable 14 includes upper and lower annular support plates 38 and 40 and suitable framing 42 joining the plates. The turntable is rotatably mounted on the base by bearings 44 and 46 respectively joining plate 38 to tower 26 and plate 40 to plate 24 for rotation of the turntable about the machine axis. Turntable drive 18 includes one or more electric motors 48 driving pinion gears 50 engagable with circumferential bull gear 52 mounted on plate 40.

Each mold unit 20 includes a mounting plate 54 located above support plate 38 and secured to the support plate by three vertical slide rods 56 secured to the bottom of the mounting plate and extending downwardly through sleeve bearings 58 on plate 38. The lower ends of rods 56 extend below plate 38 and are joined to support frame 60. Lift roller 62 is rotatably mounted on frame 60 at a location beneath the center of gravity of the mold unit. As shown in FIGS. 3 and 7, the roller 62 rotates about a radial axis.

Figure 8:
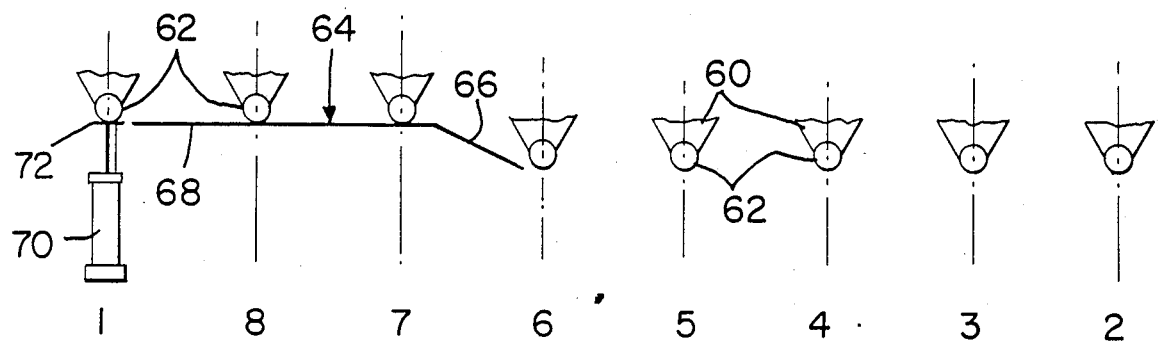
FIG. 8 is a diagrammatic view showing the lift cam, the vertical position of the mold assemblies at each station around the machine and the drop cylinder.

Lift cam 64 on base 12 extends around tthe circumference of the machine from shortly after station 6 to station 1. See FIGS. 3 and 8. The cam includes a rise surface 66 located between stations 6 and 7 and an elevated swell surface 68 extending around the machine between stations 7 and 1. Hydraulic drop cylinder 70 is mounted on frame 12 at a position beneath roller 62 when a mold unit is in station 1. A support pad 72 is mounted on the end of cylinder rod 74. When the cylinder is extended the pad forms a continuation of dwell surface 68 to support the mold unit 20 at station 1 in an elevated position. Pad 72 also carries four alignment shafts 76 (only one of which is illustrated) which extend into bores in cylinder support 78 to prevent twisting and deflection of the pad as the mold unit is moved from the cam to the pad.

As mold units 20 are rotated between stations 6 and 7 rollers 62 engage the rise surface 66 and lift the mold units 20 to the position shown in FIG. 3. Following closing of the mold halves the cylinder 70 is rapidly retracted thereby permitting the mold units to fall from the position of FIG. 3 to the position of FIG. 4. A pair of shock absorbers 80 and 82 are mounted respectively on upper support plate 38 and lower support plate 40 as shown in FIGS. 3 and 7. Adjustable stops 84 and 86 are mounted respectively on plate 54 and the lower end of the inner slide rod 56 above shock absorbers 80 and 82. The stops extend through strike plates 88 and 90.

Each shock absorber includes a plunger 92 projecting toward the adjacent stop and into a support collar 94 having a resilient pad 96 on the upper end facing the adjacent strike plate. The plunger is connected to a dash pot located in the body of the absorber. Retraction of cylinder 70 permits the mold unit to fall until stops 84 and 86 engage the shock absorber plungers 92 to cushion the fall. Pads 96 also cushion the mold unit fall as the mold unit contact the supports 94.

Mold units 20 each carry a pair of complimentary mold halves 98 mounted in inner and outer platens 100 and 102. Each platen carries a pair of sleeve bushings 104 fitted on spaced parallel slide bars 106. The bars are mounted above plate 54 in support blocks 108 and an end block 109 which extends between the outer ends of the slide bars. The mold units each also include a mold clamp drive 110 for moving the platens and mold halves between open and closed positions. Drive 110 includes an actuator 112 mounted on the radial inner end of plate 54 and connected to a driven head 114 located beneath drive head 34 when the mold unit is at station 1. The actuator is located at the same level as the slide bars 106. The driver head 114 is engagable with drive head 34 to form a disengable connection between driver 30 and the mold clamp drive. Connecting rod 118 joins actuator 112 to vertical yoke 120. The upper end of the yoke is connected to a clamp rod 122 which extends freely through platen support post 124 and engages the outer surface of platen 100 through a stiff spring 126, conventionally a stacked series of dished spring washers.

The lower end of yoke 120 extends through cut-out opening 128 in plate 54 and is connected to first horizontal yoke 130 having ends located outwardly of the sides of central cut-out opening 132 also formed in plate 54. A pair of parallel actuating rods 134 are mounted on the lower surface of plate 54 in blocks 136. The inner ends of rods 134 are secured to the outer ends of horizontal yoke 130 to one side of opening 132. The outer ends of the rods are connected to a second horizontal yoke 138 located outwardly of the opening 132.

A double ended pivot bar 140 is rotatably mounted on a projection 142 extending outward from the center of end block 109. The lower end of bar 140 is connected to a link 144 pivotedly connected to the center of second horizontal yoke 138. The upper end of bar 140 is connected to the clamp rod 146 for outer platen 102 through link 148. The clamp rod 146 extends through a platen support post 150 like post 124 and is connected to the outer surface of platen 102 through stiff spring 152 like spring 126.

Mold units 20 are moved to station 1 with the mold halves open. When the station 1 roller 62 is supported on raised pad 72 so that the unit is in the upper position and a drive connection is formed between heads 34 and 114. The mold halves 98 are moved around the growing resin parisons 154 extending down from the head die 22. Head 22 extrudes one parison for each mold cavity in the mold. Mold halves 98 define three mold cavities 156 for simultaneous blow molding of three bottles.

The mold halves are closed by actuating driver 30 to rotate the shift actuator 112 thereby moving the vertical yoke 120 radially outwardly. Outward movement of the upper end of the yoke moves platen 100 and the inner mold half 98 toward the parisons. Outward movement of the lower end of yoke 120 moves actuating rods 134 outwardly to rotate the lower end of pivot bar 140 outwardly so that upper end of the bar is rotated inwardly a corresponding distance and platen 102 and the outer mold half 98 are moved inwardly toward the parisons. Final closing of the mold halves compresses springs 126 and 152 to control the forces biasing the mold halves against each other.

During closing of the mold halves the driver 30 moves the actuator 112 a slight distance past the fully extended position and against a stop. When in this position springs 126 and 152 hold the mold halves together and the actuator against the stop to prevent opening of the mold halves.

Considerable force is required to hold the mold halves 98 together during blow molding. The force required to close the outer mold half 98 is transmitted from vertical yoke 120 underneath the slide bars 106 and plate 54 and then is transmitted back above the bars and plate to clamp rod 146 by the pivot bar 140. The pivot bar rotates about a pivot axis located at the same vertical level as the slide bars 106. The clamp rods 122 and 146 are located the same distance above the slide bars as the actuating rods 134 are located below the slide bars. This arrangement assures that the slide bars 106 and the plate 54 on which they are mounted are not subjected to high torsional forces when the required high closing forces are applied. These forces are sufficient to bend the slide bars and plate and prevent proper closing of the mold halves.

A blow pin unit 158 is mounted on support frame 60 beneath opening 132 and extends up toward mounting plate 54 through an opening in the support plate 38 (not illustrated). The unit includes a vertically extending blow pin 160 for each mold cavity 156. As shown in FIGS. 3 and 4, unit 158 extends upwardly through the opening so that the blow pins are located adjacent the mouth portions of the inverted blow cavities.

A microprocessor control unit (not illustrated) operates rotary blow molding machine 10 and the extruder or extruders supplying molten resin to extrusion die head 22. The turntable drive indexes the turntable in the direction of arrow 16 45 degrees at a time so that each mold unit 20 is moved in a clockwise direction from a former station to the adjacent clockwise station. Following indexing the drive is deactivated for a dwell period prior to the next indexing step.

The operation of machine 12 is described by following a single mold unit completely around the machine from station 1 through stations 2 through 8 and back to station 1.

When indexed from station 8 to station 1 the mold halves 98 are fully open. The mold halves are rotated to station 1 to either side of the growing parisons 154 extending vertically below the extrusion die head 22. With the turntable drive deactivated and the mold unit dwelling at station 1 the lower ends of the parisons grow down over the upper ends of the blow pins 160. The cylinder 70 is extended so that support pad 72 forms a continuation of the end of lift cam dwell surface 68. See FIGS. 3 and 7. Roller 62 rests on raised pad 72 to hold the mold unit in the elevated position of FIG. 3 with driven head 114 adjacent and engaged with drive head 34. As soon as the lead ends of the parisons have grown down over the blow pin, driver 30 is actuated to shift the actuator 112 radially outwardly to close the mold halves 98 and capture each parison in a mold cavity.

The extrusion die head 22 is programmable to vary the thickness of the parisons depending upon the blow ratio. The programmer automatically thins the wall sections of the parisons as the mold halves close to provide thin, weak parisons immediately above the closed mold halves. On closing of the mold halves cylinder 70 is rapidly retracted and pad 72 is accelerated down away from roller 62. Rapid retraction of the pad allows the mold unit 20 to gravity-fall from the elevated position of FIG. 3 to the lower position of FIG. 4 where the unit is supported by collars 94. The mold unit free falls until adjustable stops 84 and 86 engage the shock absorber plungers 92 and the shock absorbers slow the descent of the unit until pads 88 and 90 engage resilient pads 96 on the tops of the collars 94.

Initial vertical descent of the closed mold halves breaks the thin portion of the parisons to free the captured parisons in the mold halves from the lower end of the newly formed, continuously growing parisons 162. The mold halves fall down faster than the parisons grow. Breakaway of the captured parisons occurs as the mold falls straight down without lateral shifting of the newly forming parisons. Shifting could prevent the growing new parisons from surrounding the blow pins 160 of the next mold unit.

After breakaway of the captured parisons, the controller actuates the drive 18 to rotate the turntable 14 through 45 degrees and index the mold unit from position 1 to position 2. Indexing preferably begins before the unit has fallen onto collars 94. At the same time, a new mold unit with open mold halves is indexed from station 8 to station 1. Cylinder 70 is extended to raise pad 72 to the level of the dwell surface 68 during indexing to support the roller of the mold unit moving to station 1. During indexing, driver 30 is actuated to return drive head 34 to a position for engaging and shifting the actuator of the next mold unit and closing the mold halves of the unit.

Closing of the mold halves captures the lower ends of the parisons between the blow pins and the mouths of the inverted mold cavities. After the mold halves begin to drop pressurized blow air flows through the pins and into the interior of the parisons to blow the parisons against the closed mold halves and form bottles or articles conforming to the shape of the mold cavities.

The mold halves remain closed and the mold unit remains in the lower position supported by collars 94 as the unit is rotated through stations 2, 3, 4, 5 and 6. During this time cooling water flowed through the mold halves cools the expanded parisons to form rigid, cooled bottles or articles. The water flows to and from the mold halves through conduits (not illustrated) joining each mold half to rotary union 28.

Figure 2:
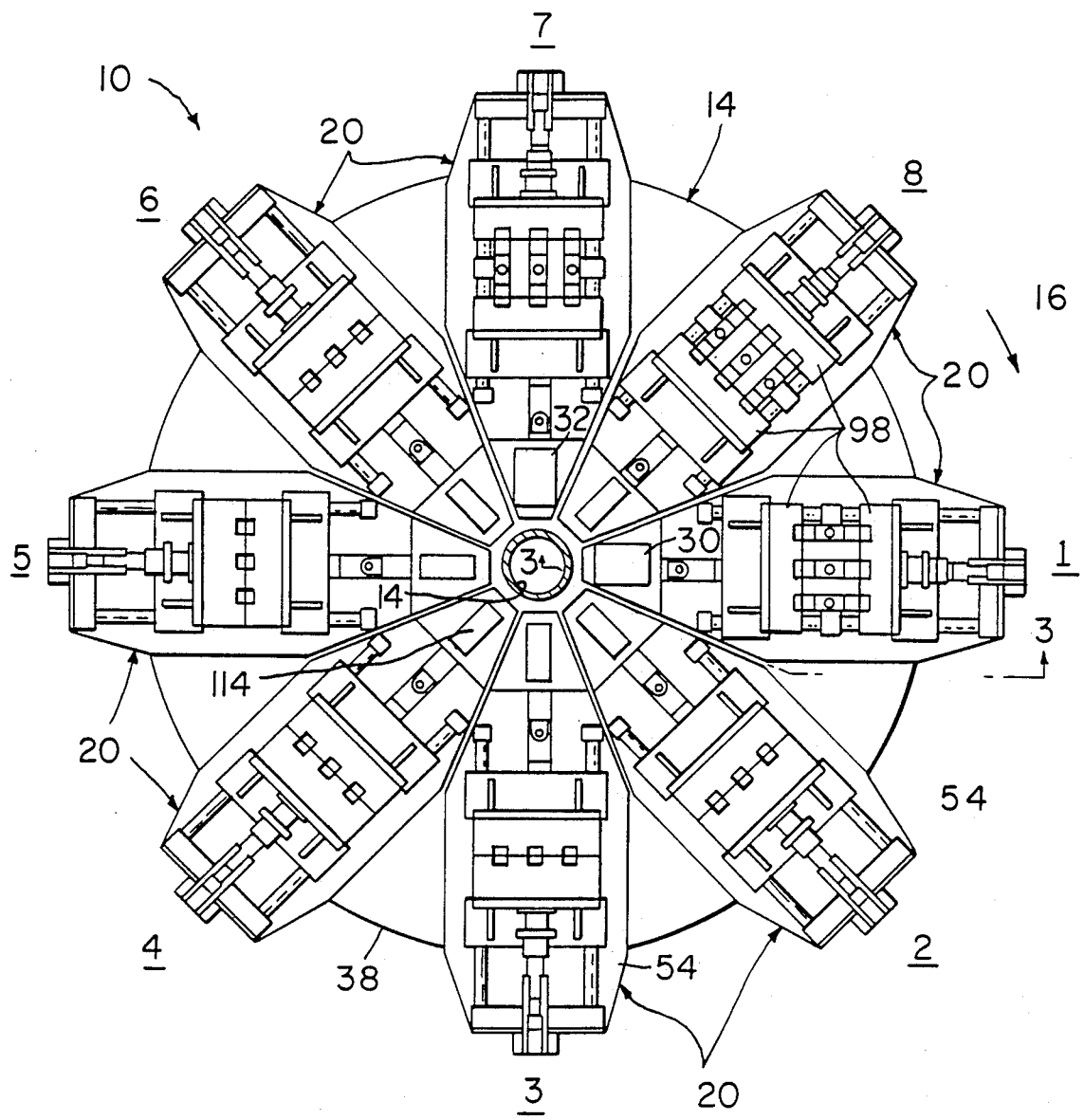
FIG. 2 is a top view of the machine, partially broken away.

During indexing of the turntable to move the mold unit from station 6 to station 7 roller 62 contacts lift cam rise surface 66 and the mold unit is moved up onto dwell surface 68 at station 7. Movement of the mold unit to station 7 moves driven head 114 beneath and into engagement with the drive head 34 of driver 32 shown in FIG. 2. During the dwell period when the mold unit is in station 7 driver 32 is actuated to open the mold halves. Ejection tooling (not illustrated) at station 7 removes the formed and cooled bottles from between the opened mold halves. Driver 32 is returned to the start position as the mold unit is indexed to station 8.

Further indexing of the turntable 14 moves the mold unit to station 8. An in-mold labeling device may be provided at this station to apply labels to the interior walls of the mold cavities 156. The labels become an integral part of the blow molded article in a conventional manner. Subsequent indexing of the turntable returns the open mold unit to station 1 to complete the cycle of operation.

The disclosed blow molding machine 10 includes mold units carrying three cavity mold halves so that three bottles are blow molded by each mold during one cycle of operation. The machine may be used to mold greater or fewer bottles or articles as required. Also, the articles may be blown by blow pins as illustrated or by blow needles were desired.

The captured parisons may be severed from the newly forming parisons 162 using conventional cutting tooling, if required. In such case, it is not necessary to thin the walls of the parisons above the closed mold halves.

In the disclosed example the mold units gravity-fall down from the elevated position. Alternatively, the units may be lowered by a fast acting mechanical or hydraulic drive.

Machine 10 as described blow molds articles in each mold unit. Alternatively, it is possible to run the machine 10 so that articles are blow molded by alternate mold units only with the remaining four unused units left open. In this case drive 18 may index the turntable 90 degrees at a time.

Machine 10 may be setup with four 90 degrees spaced mold units each carrying molds for making one type of bottle or article and the other 90 degrees space mold units carrying molds for making another type of bottle or article. The machine may be run using either set of molds by indexing the turntable 90 degrees between dwells and leaving the other unused molds open. This flexibility is particularly useful when bottles or articles are made in short production runs or when the production facility includes only a single blow molding machine. If desired, the machine may be run using both sets of the molds to make different types of articles or bottles during a single production run.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What we claim as our invention is:

1. A method of blow molding an article using a pair of mold halves defining a mold cavity when closed and an extrusion die head, including the steps of:
    a. continuously extruding a thermoplastic resin parison vertically downwardly from an extrusion die head and into an extrusion station;
    b. moving an open pair of vertically supported mold halves into the extrusion station to either side of the downwardly growing parison;
    c. supporting said mold halves vertically at said extrusion station by a support pad movable away from the mold halves;
    d. closing the mold halves to capture the parison within the mold cavity;
    e. separating the captured parison from a growing new parison above the closed mold halves;
    f. moving the closed mold halves from the growing new parison by rapidly withdrawing the support pad away from the mold halves and allowing the closed mold halves and captured parison to gravity free-fall vertically downwardly away from the extrusion die head without lateral shifting at a rate greater than the rate of new parison growth down from the extrusion die head until the mold halves are free of the new parison and then moving the mold halves away from the extrusion station;
    g. maintaining the new parison without lateral shifting during steps e. and f.;
    h. blowing the captured parison against the mold cavity to form the article; and,
    i. opening the mold halves and ejecting the blown article.

2. The method of claim 1 including the step of moving the closed mold halves and captured parison down during movement away from the extrusion station.

3. The method of claim 1 wherein the mold halves are located above a mounting plate and are secured to the mounting plate by a slide connection, located away from the mold halves including the step of closing the mold halves without subjecting the slide connection to torsional loading sufficient to alter the alignment between the mold halves when closed.

4. The method of claim 1 including the steps of extruding the lower end of the parison down over a blow pin in the extrusion station, closing the mold halves on the blow pin to capture the end of the parison and the blow pin in a mouth opening at the bottom of the mold cavity and to flow a gas through the flow pin and into the interior of the captured parison to blow the parison against the mold cavity.

* * * * *

UNITED STATES PATENT AND TRADEMARK OFFICE
CERTIFICATE OF CORRECTION

PATENT NO. : 4,861,542
DATED : August 29, 1989
INVENTOR(S) : Frederick J. Shepps It is certified that error appears in the above—identified patent and that said Letters Patent is hereby corrected as shown below:

On the title page,

Item [75], delete "Paul M. Oles" and "both".

<u>In the Specification</u>:

Column 1, line 51 delete "and".

Column 4, line 13 change "swell" to --dwell--.

Column 5, line 20 after "When" insert --at-- and delete "the".

Column 7, line 44 change "were" to --where--.

Column 8, line 14 change "we" to --I-- and "our" to --my--.

Signed and Sealed this

Second Day of October, 1990

Attest:

HARRY F. MANBECK, JR.

*Attesting Officer*  *Commissioner of Patents and Trademarks*